(12) United States Patent
Naik et al.

(10) Patent No.: US 6,866,383 B2
(45) Date of Patent: Mar. 15, 2005

(54) TOPCOAT COMPOSITIONS, SUBSTRATES CONTAINING A TOPCOAT DERIVED THEREFROM, AND METHODS OF PREPARING THE SAME

(75) Inventors: Kirit N. Naik, Mentor, OH (US); Curtis E. Hess, Painesville, OH (US); Thomas J. Paquin, Madison, OH (US); Stefanie J. Rose, Painesville, OH (US)

(73) Assignee: Avery Dennison Corporation, Pasadena, CA (US)

( * ) Notice: Subject to any disclaimer, the term of this patent is extended or adjusted under 35 U.S.C. 154(b) by 193 days.

(21) Appl. No.: 10/222,751

(22) Filed: Aug. 16, 2002

(65) Prior Publication Data

US 2003/0112311 A1 Jun. 19, 2003

Related U.S. Application Data

(60) Provisional application No. 60/313,268, filed on Aug. 17, 2001.

(51) Int. Cl.[7] .................................................. B41J 2/01
(52) U.S. Cl. ........................ 347/105; 347/101; 428/32.1
(58) Field of Search ................................ 347/101, 100, 347/96, 105; 428/195, 32.1, 448

(56) References Cited

U.S. PATENT DOCUMENTS

| | | | |
|---|---|---|---|
| 4,944,988 A | 7/1990 | Yasuda et al. ............... 428/195 |
| 5,660,622 A | * 8/1997 | Nikoloff ...................... 347/105 |
| 5,753,082 A | * 5/1998 | Yoshida et al. .............. 347/105 |
| 5,853,540 A | 12/1998 | Niemoller et al. ........... 162/135 |
| 5,853,899 A | * 12/1998 | Anderson et al. ............ 347/105 |
| 5,932,355 A | * 8/1999 | Iqbal et al. ................. 428/32.1 |
| 5,952,104 A | 9/1999 | Sugiyama et al. |
| 6,214,449 B1 | * 4/2001 | Otani et al. ............... 428/32.24 |

FOREIGN PATENT DOCUMENTS

| EP | 1 059 173 A2 | 6/2000 | |
|---|---|---|---|
| EP | 1059173 A2 | * 12/2000 | ............ B41M/5/00 |

OTHER PUBLICATIONS

PCT/US02/26136; PCT International Search Report mailed Dec. 18, 2002.

* cited by examiner

*Primary Examiner*—Manish Shah
(74) *Attorney, Agent, or Firm*—Renner, Otto, Boisselle & Sklar, LLP

(57) ABSTRACT

This invention relates to an ink-receptive composition, including: (a) a filler; (b) a binder having a $T_g$ of less than 30° C.; and (c) a cationic polymer; wherein the composition, when coated on a substrate, forms an ink-receptive coating which accepts ink loading greater than about 300%. The coating compositions provide a printable surface receptive to high loading of ink-jet inks which do not crack at loading in excess of 300%, and in one embodiment, do not crack at loading up to about 400%. In addition, the print shows superior liquid resistance and the print quality of the inks is improved and a reduction in bleeding of colors occurs. Also, printed article have outdoor durability especially those with overlaminates.

26 Claims, 2 Drawing Sheets

TOPCOAT COMPOSITIONS, SUBSTRATES CONTAINING A TOPCOAT DERIVED THEREFROM, AND METHODS OF PREPARING THE SAME

This application claims the benefit of provisional application 60/313,268 filed on Aug. 17, 2001, which is hereby incorporated herein by reference in its entirety.

FIELD OF THE INVENTION

This invention relates to ink-receptive topcoats, especially topcoats which are receptive to high loading of ink-jet inks.

BACKGROUND OF THE INVENTION

Ink-jet technology utilizes an aqueous based delivery system in which the ink pigments or dyes are delivered to a substrate together with a liquid. The substrate usually has a topcoat which contains at least one absorbent material to remove the liquid of the ink-jet ink. The conventional ink-jet printing technology is based on liquid based inks, such as water or oil based inks. Typically the coatings include resins and/or fillers which are able to swell and absorb liquid. Examples of these resins include gelatin, polyvinyl pyrrolidone, and polyvinyl alcohol.

As ink-jet printing is applied to larger formats, the loading of ink is increased dramatically. In color printing, the ink is typically in the form of color dyes or pigments. When one color is applied at its full strength, it is considered to be a 100 percent loading. When two colors are applied at full strength, it is considered to be a 200 percent loading, and so on. In a four-color large format ink-jet print, the ink loading may exceed 300 percent loading. As the level of ink increases, there is a greater amount of solvent from the ink that must be absorbed. This greater level of ink is especially a problem with the ink loading levels exceed 300%. Problems include ink cracking, bleeding and smearing.

A need exists for an ink-receptive composition that provides a good medium for high loading of ink-jet inks. These ink receptive coatings should not crack under such high loading.

SUMMARY OF THE INVENTION

This invention relates to an ink-receptive composition, comprising: (a) a filler; (b) a binder having a $T_g$ of less than 30° C.; and (c) a cationic polymer; wherein the composition, when coated on a substrate, forms an ink-receptive coating which accepts ink loading greater than about 300%. The coating compositions provide a printable surface receptive to high loading of ink-jet inks which do not crack at loading in excess of 300%, and in one embodiment, do not crack at loading up to about 400%. In addition, the print shows superior liquid resistance and the print quality of the inks is improved and a reduction in bleeding of colors occurs. Also, the printed articles have good outdoor durability, especially those with overlaminates.

DETAILED DESCRIPTION OF THE INVENTION

Figure 1:
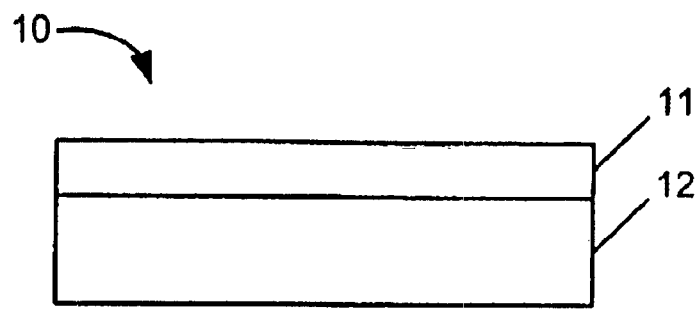
FIG. 1 is a cross-section of an ink jet printable media having an ink receptive layer and a substrate.

This invention relates to an ink-receptive composition, comprising: (a) a filler; (b) a binder having a $T_g$ of less than 30° C.; and (c) a cationic polymer; wherein the composition, when coated on a substrate, forms an ink-receptive coating which accepts ink loading greater than about 300%. In one embodiment, the ink loading level is greater than about 320%, or greater than about 350% or greater than about 375% or even to 400%. In another embodiment, the $T_g$ of the binder is less than about 27° C., or less than about 25° C. Additionally, it should be noted that here and in the following text, range and ratio limits may be combined.

The ink jet media prepared with these compositions have improved smoothness. Ink jet media must be smooth and uniform to maximize the clarity and detail of the printed image. Also, smooth and uniform media require less coating to "fill in" imperfections on the surface. In one embodiment, the smoothness is less that 40%, or less than 25%, or less than 15% Sheffield roughness. The media also has good brightness. The brightness is typically greater than 90%, or even greater than 95%. In another embodiment, the ink jet media has an opacity of greater than 95%.

As noted herein, the present invention provides a topcoat for ink-jet inks. These inks are known to those in the art and include aqueous based ink-jets, such as those commercially available and prepared by Du Pont, Ilford, Epson, Canon, Alecia, Inkware, Sericol, Lyson, Sunjet, and American Ink.

The ink receptive coating may be used with narrow or wide format printers. Examples of narrow format printers are those made by Hewlet Packard, Epson, Canon, Lexmark, and Xerox. The following table contains examples of wide format printers.

| Company | Printers | Print Technology | Ink Types |
|---------|----------|------------------|-----------|
| Encad | Novajet 850 | Ink Jet | Dye and pigment |
|  | Novajet 750 | Thermal | based |
|  | NovaJet 630 |  |  |
|  | Novajet 500 |  |  |
| Epson | Stylus Pro 10000 | Ink Jet Piezo | Dye and Pigment |
|  | Stylus Pro 9500 |  | based |
|  | Stylus Pro 9000 |  |  |
|  | Stylus Pro 7500 |  |  |
|  | Stylus Pro 7000 |  |  |
|  | Stylus Pro 5500 |  |  |
| Gretag Professional Imaging | Bellise Bellise Plus | Ink Jet Piezo | Dye and Pigment based |
| Hewlett-Packard | HP DesignJet 5000, 5000ps, 5000UV and 5000psUV | Ink Jet Thermal | Black Pigment based and color Dye based |
| Ilford | Ilfostar Novajet 700i Novajet630i | Ink Jet Thermal (Microbust Print Technology) | Dye and Pigment based |
| Kodak | 3062 | Ink Jet Piezo | Dye and Pigment based |
| Kodak | 4860 | Ink Jet thermal | Dye and Pigment based |
| Kodak | 4042 | Ink Jet thermal | Dye and Pigment based |

-continued

| Company | Printers | Print Technology | Ink Types |
|---|---|---|---|
| Kodak | 4842 | Ink Jet thermal | Dye and Pigment based |
| Kodak | 3043 | Ink Jet Piezo | Dye and Pigment based |
| Kodak | 4060 | Ink jet Thermal | Dye and Pigment based |
| Kodak | 3038 | Ink Jet Piezo | Pigment based |
| MacDermid | Display Maker Match 12/42 | Ink Jet Thermal | Dye and Pigment based |
| ColorSpan | Display Maker Series XII/72 Display Maker Esprit/62 | | |
| Mimaki | JV4-130, JV2-160, JV2-180 | Ink Jet Piezo | Pigment and Dye based |
| Oc'e USA | CS5090 Series | Ink Jet Thermal | Pigment and Dye based |
| Roland DGA Corp. | HI-FI Jet Pro | Ink Jet Piezo | Pigment and Dye based |
| Xerox Engineering Systems | ColorGrafX X2 | Ink Jet Piezo | Oil based Pigmented |
| Tekragraf | Seiko IP-4500 Seiko IP-4010 | Ink Jet Piezo | Oil based Pigmented |

The topcoat composition will generally have a dry coat weight of from about 1 g/m² to about 100 g/m², or from about 5 g/m² to about 85 g/m², or from about 10 g/m² to about 70 g/m², or from about 20 to 65 g/m², depending on the particular face or label stock employed. In one embodiment, the ink receptive media is used in wide format graphics. In this embodiment, the dry coat weight is from about 10 g/m² to about 80 g/m², or from about 20 g/m² to about 70 g/m² or from about 30 g/m² to about 65 g/m². In another embodiment, the ink jet media is a narrow format graphic. In this embodiment, the dry coat weight is from about 1 g/m² to about 60 g/m², or from about 5 g/m² to about 20 g/m².

In one embodiment, the ink receptive layer has a thickness of about 0.1 to about 4, or from about 0.25 to about 3.5, or from about 0.5 to about 3.25, or about 1 to about 3 mils.

Filler

As described above, the coating compositions include at least one filler. The filler may be organic or inorganic. Combinations of fillers may be used, including combinations of organic and inorganic fillers. Typically, the fillers are those that have a surface area of at least 1 m²/g. In another embodiment, the surface area of the filler is greater than about 5, or greater than about 10, or greater than about 20 m²/g. In another embodiment, the fillers are those having a surface area of greater than about 200 m²/g. In one embodiment, the filler has a surface area of at least about 40, or at least 60, or at least about 100 m²/g. The surface area of the filler is determined by BET (Brunauer, Emmett and Teller method described in J. American Chemical Society Vol. 60, page 309 (1938)). This method is based on the adsorption of gaseous nitrogen. In one embodiment, the ink-receptive compositions prepared in accordance with the present invention contain from about 20% to about 70%, or from about 30% to about 60%, or from about 40% to about 50% by weight filler, based on the dry weight of the other ingredients.

In one embodiment, the filler is present in a minor amount. In one embodiment, the filler is present in an amount from about 5% up to about 49%, or from about 10% up to about 40%, or from about 15% to about 35%. In another embodiment, the filler is present in an amount greater than 20%, or greater than 30% and up to about 50%, or up to about 45%.

In one embodiment, the binder to filler ratio is at least about one to about 0.5–2, or about 0.75–1.7, or about 1–1.5. A typically useful binder to filler ratio is about 1:1–1.3.

Examples of fillers include materials that increase the opacity and/or modify the porosity of the coated substrate. In one embodiment, the filler is an inorganic pigment; non-limiting examples include silica, silicic acid, clays, zeolites, alumina, an alkaline earth metal sulfate or carbonate, an alkaline earth or transition metal oxide or hydroxide. Specific examples of fillers include titanium dioxide, magnesium carbonate, calcium carbonate, and silica, such as amorphous silica, fumed silica, colloidal silica, precipitated silica and silica gels. The filler increases the ink-absorbability and improves the print quality and water resistance of the dried coating, and enables the coating to be used with water-based inks containing a dye colorant, as well as pigmented, water-based inks.

The following table contains filler that may be used in the coating compositions.

| FILLERS | | |
|---|---|---|
| Source | Name | Filler Type |
| Degussa | Sipernat 570 | Precipitated silica |
| Grace | Syloid W500 | silica gel |
| Grace | Syloid W300 | silica gel |
| Grace | Sylojet 710A | silica gel |
| Degussa | Sipernat 383 DS | Precipitated silica |
| Degussa | Sipernat 350 | Precipitated silica |
| Imerys | China Clay Supreme | $SiO_2$—$Al_2O_3$ |
| Imerys | Carbital 110 | Calcium carbonate |
| Viaton Industries Ltd | Airwhite AW5 | Barium sulphate |
| Ineos Silicas | Gasil | Silica gel |

In addition to the filler(s) included to increase the opacity and/or modify the porosity of the coated substrate, in one embodiment of the invention an additional filler is added to increase the opacity of the coating and to balance the overall properties of the coating, including, for example, ink absorption. Examples of fillers include a colloidal dispersion silica, such as Ludox CL-P™, available from DuPont de Nemours, E.I., Co. (Wilmington, Del.) and silica fillers available from W. R. Grace as Syloid fillers, such as Syloid W-300.

Binders

The binder may be any film forming monomer, oligomer or polymer or combinations thereof. Examples of useful binders include vinyl acetate or vinyl alcohol homopolymers and co- or terpolymers derived therefrom, polyurethanes, polyacryls, polymethacryls, thermoplastic polymers of ethylene and propylene, ionomers, polyesters, polyamides, polyvinyl alcohols, styrenic resins, and combinations and blends of two or more thereof. In one embodiment, the binder is a homopolymer, copolymer or terpolymer of a vinyl acetate, a vinyl alcohol, or combination thereof. In one embodiment, the binder composition is present in an amount from about 40% to about 90%, or from about 50% to about 85%, or from about 55% to about 75% by weight of the solids of the coating composition. In another embodiment, the binder is present in an amount from about 20 to about 70%, or from about 25% to about 60%, or from about 30% to about 50% by weight of the solids of the coating composition.

As used herein, a "polyacryl" includes a polyacrylate, polyacrylic, or polyacrylamide. As used herein, a "polymethacryl" includes a polymethacrylate, polymethacrylic, or polymethacrylamide.

In one embodiment, the binder is a homopolymer, copolymer or terpolymer of vinyl compound. Examples of these polymers include polyvinyl acetate, polyethylene vinyl acetate, acrylic acid or acrylate-modified ethylene vinyl acetate resins, acid-, anhydride- or acrylate-modified ethylene/vinyl acetate copolymers; acid- or anhydride-modified ethylene/acrylate copolymers. In one embodiment, the binder is a thermoplastic copolymer or terpolymer derived from an olefins, such as an olefin containing from 2 to about 8 carbon atoms, such as ethylene or propylene and a functional monomer selected from the group consisting of alkyl acrylate, acrylic acid, alkyl acrylic acid, vinyl acetate, vinyl alcohol, vinyl halide and combinations of two or more thereof. The copolymer or terpolymer generally has a melting point in the range of about 50° C. to about 120° C., and in one embodiment about 60° C. to about 110° C. The functional monomer(s) component ranges from about 1 to about 15 mole percent, and in one embodiment about 1 to about 10 mole percent. In one embodiment, ethylene/vinyl acetate copolymers include those with a vinyl acetate content of at least about 15% by weight, and, in one embodiment, about 15% to about 40% by weight, or from 20% to 35%, or from about 22% to about 28% by weight.

Examples of commercially available homopolymers of vinyl acetate includes Resyn 1025 and Resyn X-208, available from National Starch and Chemical Company. Examples of commercially available copolymers and terpolymers that can be used include the ethylene/vinyl acetate copolymers available from DuPont under the tradename Elvax. These include Elvax 3120, which has a vinyl acetate content of 7.5% by weight and a melting point of 99° C., Elvax 3124, which has a vinyl acetate content of 9% by weight and a melting point of 77° C., Elvax 3150, which has a vinyl acetate content of 15% by weight and a melting point of 92° C., Elvax 3174, which has a vinyl acetate content of 18% by weight and a melting point of 86° C., Elvax 3177, which has a vinyl acetate content of 20% by weight and a melting point of 85° C., Elvax 3190, which has a vinyl acetate content of 25% by weight and melting point of 77° C., Elvax 3175, which has a vinyl acetate content of 28% by weight and a melting point of 73° C., Elvax 3180, which has a vinyl acetate content of 28% by weight and a melting point of 70° C., Elvax 3182, which has a vinyl acetate content of 28% by weight and a melting point of 73° C., and Elvax 3185, which has a vinyl acetate content of 33% by weight and a melting point of 61° C., and Elvax 3190LG, which has a vinyl acetate content of 25% by weight, a melting point of about 77° C. and a glass transition temperature ($T_g$) of about −38.6° C. Commercial examples of available polymers include Escorene UL-7520, a copolymer of ethylene with 19.3% vinyl acetate (Exxon).

Other examples of commercially available EVA resins are available from Air Products & Chemicals, Inc., Allentown, Pa., under the AIRFLEX trademark. Examples include AIRFLEX 465® (65% solids) and AIRFLEX 7200® (72–74% solids). Another suitable EVA emulsion polymer is AIRFLEX 426®, a high solids, carboxylated, EVA polymer partially functionalized with carboxyl groups. It is believed that the AIRFLEX brand EVA emulsion polymers are stabilized with up to about 5% by weight polyvinyl alcohol (PVOH) and/or, in some formulations, a nonionic surfactant. Ethylene vinyl acetate copolymers are also known as Duro-set E-200 and E-230, available from National Starch and Chemical Company.

In another embodiment, the binder is a vinyl alcohol polymer. The vinyl alcohol polymers include homopolymers of vinyl alcohol and co- and terpolymers of vinyl alcohol and co-monomers mentioned above for the vinyl acetate and vinyl halide. The polyvinyl alcohols are available commercially from Air Products under the trade designation Airvol and form Celanese as Celvol.

In one embodiment, the binder is a polyurethane. The polyurethane is typically the reaction products of the following components: (A) a polyisocyanate having at least two isocyanate (—NCO) functionalities per molecule with (B) at least one isocyanate reactive group such as a polyol having at least two hydroxy groups or an amine. Suitable polyisocyanates include diisocyanate monomers, and oligomers. Aliphatic polyisocyanates include 1,6-hexamethylene diisocyanate (HMDI) and its isocyanurate-containing derivatives; cycloaliphatic polyisocyanates such as 4,4'-methylene bis(cyclohexyl isocyanate) ($H_{12}$ MDI), cyclohexane 1,4-diisocyanate and its isocyanurate derivatives; aromatic polyisocyanates such as 4,4'-diphenylmethane diisocyanate (MDI), xylyene diisocyanate (XDI), toluene diisocyanate (TDI), isophorone diisocyanate (IPDI), 1,5-naphthalene diisocyanate (NDI), 4,4',4"-triphenylmethane diisocyanate, and their isocyanurate-containing derivatives. Mixtures or the reaction products of polyisocyanates can be used. Polyisocyanates contain the reaction products of these diisocyanate including isocyanurate, urea, allophanate, biuret, carbodiimide, and uretonimine entities.

Examples of polyisocyanates include ethylene diisocyanate, 1,4-tetramethylene diisocyanate, 1,6-hexamethylene diisocyanate (HDI), 1,12-dodecane diisocyanate, cyclobutane, 1,3-diisocyanate, 1-isocyanato-3, 3,5-trimethyl-5-isocyanato methyl cyclohexane, bis(4-isocyanato cyclohexyl)methane, isophorone diisocyanate (IPDI), bis(4-isocyanatocyclohexo)methane; 4,4'-methylene-dicyclohexyl diisocyanate; 1,6-diisocyanato-2,2, 4,4-tetramethylhexane; 1,6-diisocyanato-2,4,4-trimethylhexane; cyclohexane-1,4-diisocyanate; etc. Desmodur H® from Miles Inc. is described as HDI having an NCO content of 50%, and Desmodur W from Miles Inc. is described as bis (4-isocyanato-cyclohexyl)methane containing 32% of NCO.

In another embodiment, the isocyanate reactive group is a polyol. The polyol (B) may be selected from those commonly found in polyurethane manufacturing. They include hydroxy-containing or terminated polyesters, polyethers, polycarbonates, polythioethers, polyolefins, and polyesteramides. Suitable polyester polyols include hydroxy-terminated reaction products of ethylene glycol, propylene glycol, diethylene glycol, neopentyl glycol, 1,4-butanediol, furan dimethanol, polyether diols, or mixtures thereof, with dicarboxylic acids or their ester-forming derivatives. Polyesters obtained by the polymerization of lactones, such as caprolactone may also be used.

Polyether polyols useful for the polyurethane reaction include products obtained by the polymerization of a cyclic oxide including ethylene oxide, propylene oxide or tetrahydrofuran, or mixtures thereof. Polyether polyols include polyoxypropylene (PPO) polyols, polyoxyethylene (PEO) polyols, poly(oxyethylene-co-oxypropylene) polyols, polyoxytetramethylene (PTMO) polyols.

Polycarbonate polyols useful for the polyurethane reaction include the products represented by the reaction products obtained by reacting diols such as 1,3-propanediol, 1,4-butanediol, 1,5-pentanediol, 1,6-hexanediol, diethylene glycol with diaryl carbonates such as diphenyl carbonate, or with phosgene, or with aliphatic carbonate, or with cycloaliphatic carbonate. Commercial polycarbonate diols include Duracarb 120 series aliphatic diols and Durocarb 140 series cylco aliphatic diols, both of PPG Industries.

In another embodiment, (B) the isocyanate reactive group may be of ionic, ionic precursor or nonionic type. The isocyanate-reactive group include those compounds containing active hydrogen such as diols, polyols, diamines, and polyamines. The isocyanate reactive groups include anionic and cationic types. Anionic types include dihydroxy carboxylic acids such as alpha, alpha-dimethylolpropionic acid (DMPA), diamino carboxylic acids such as 1-carboxy, 1,5-diaminopentane, and 2-(aminoethyl) aminoethyl carboxylic acid; and sulfonate diamines. Anionic type of hydrophilic groups may be the ones that readily form the salts of sulpho, sulfate, thiosulphato, phospho, phosphono, phosphato, or carboxy groups. Examples for cationic type include tertiary amino groups or precursors which readily form salts such as quaternary ammonium, quaternary phosphonium or ternary sulphonium salt groups.

Specific examples of the compounds containing ionic precursor groups and two or more isocyanate-reactive groups include triethanolamine, N-methyldiethanolamine and their oxyalkylation and polyesterification products, trimethylolpropane monophosphate and monosulphate, bis-hydroxylmethyl-phosphonic acid, diaminocarboxylic acids including lysine, cystine, 3,5-diamino benzoic acid, 2,6-dihyroxybenzoic acid, and dihydroxyalkanoic acids including 2,2-dimethylolpropionic acid.

Where a hydrophilic group is unreacted in preparing a polyurethane then a neutralizing compound for the hydrophilic group may be added to the reaction. Amines or ammonia such tertiary amines, such as triethylamine, triethanolamine or N-methylmorpholine, and diethyl amine or triethylamine, are effective in neutralizing carboxylic group and yields a neutralized anionic hydrophilic site on the polyurethane. In one embodiment, a chain extender that reacts with the excess or available isocyanate groups in the presence of aqueous medium and leads to a high molecular weight polyurethane aqueous dispersion. Suitable chain extenders for the further polymerization in aqueous medium are well known in the art. Selected examples include ethylene diamine, diethylene triamine, triethylene tetraamine, propylene diamine, butylene diamine, hexamethylene diamine, cyclohexylene diamine, piperazine, tolylene diamine, xylylene diamine and isophorone diamine.

Useful polyurethanes include aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. Particularly useful polyurethanes include aromatic polyether polyurethanes, aliphatic polyether polyurethanes, aromatic polyester polyurethanes, and aliphatic polyester polyurethanes.

Examples of commercial polyurethanes include Sancure 2710® and/or Avalure UR 445® (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure 878®, Sancure 815®, Sancure 1301®, Sancure 2715®, Sancure 1828®, Sancure 2026®, Sancure 1818®, Sancure 853®, Sancure 830®, Sancure 825®, Sancure 776®, Sancure 850®, Sancure 12140®, Sancure 12619®, Sancure 835®, Sancure 843®, Sancure 898®, Sancure 899®, Sancure 1511®, Sancure 1514®, Sancure 1517®, Sancure 1591®, Sancure 2255®, Sancure 2260®, Sancure 2310®, Sancure 2725®, and Sancure 12471® (all of which are commercially available from Noveon, Cleveland, Ohio), Bayhydrol DLN (commercially available from Bayer Corp., McMurray, Pa.), Bayhydrol LS-2033 (Bayer Corp.), Bayhydrol 123 (Bayer Corp.), Bayhydrol PU402A (Bayer Corp.), Bayhydrol 110 (Bayer Corp.), Witcobond W-320 (commercially available from Witco Performance Chemicals), Witcobond W-242 (Witco Performance Chemicals), Witcobond W-160 (Witco Performance Chemicals), Witcobond W-612 (Witco Performance Chemicals), Witcobond W-506 (Witco Performance Chemicals), NeoRez R-600 (a polytetramethylene ether urethane extended with isophorone diamine commercially available from Avecia, formerly Avecia Resins), NeoRez R-940 (Avecia Resins), NeoRez R-960 (Avecia Resins), NeoRez R-962 (Avecia Resins), NeoRez R-966 (Avecia Resins), NeoRez R-967 (Avecia Resins), NeoRez R-972 (Avecia Resins), NeoRez R-9409 (Avecia Resins), NeoRez R-9637 (Avecia), NeoRez R-9649 (Avecia Resins), and NeoRez R-9679 (Avecia Resins).

Particularly useful polyurethanes are aliphatic polyether polyurethanes. Examples of such aliphatic polyether polyurethanes include Sancure 2710® and/or Avalure UR 445®, Sancure 878®, NeoRez R-600, NeoRez R-966, NeoRez R-967, and Witcobond W-320.

In one embodiment, the binder is polyester polyurethane. Examples of these binder include those sold under the names "Sancure 2060" (polyester-polyurethane), "Sancure 2255" (polyester-polyurethane), "Sancure 815" (polyester-polyurethane), "Sancure 878" (polyether-polyurethane) and "Sancure 861" (polyether-polyurethane) by the company Sanncor, under the names "Neorez R-974" (polyester-polyurethane), "Neorez R-972" (polyester-polyurethane), "Neorez R-9649" (polyether-polyurethane), and "Neorez R-9679" (polyester-polyurethane), by the company Avecia (formerly Zeneca Resins), and the acrylic copolymer dispersion sold under the name "Neocryl XK-90" and "Neocryl A 5090", by the company Avecia.

In one embodiment, the binder may be an aliphatic urethane acrylate. These materials are oligomers, such as Ebecryl® 8806, having an average molecular weight of about 2,000 and a viscosity of about 10,500 centipoise, at 150° F. and manufactured and sold by Radcure Specialties, Inc. and Photomer® 6210 an aliphatic urethane acrylate oligomer having a molecular weight of about 1400, a viscosity of about 1500 centipoise at about 160° F. and manufactured and sold by Henkel Corporation.

In another embodiment, the binder is a polyacryl or polymethacryl resin. As used herein, a "polyacryl" includes polyacrylates, polyacrylics, or polyacrylamides, and "polymethacryl" includes polymethacrylates, polymethacrylics, or polymethacrylamides. These resins include those derived from acrylic acid, acrylate esters, acrylamide, methacrylic acid, methacrylate esters, and methacrylamide. The acrylate and methacrylate ester generally contain from 1 to about 30 carbon atoms in the pendant group, or from 1 to about 18, or from 2 to about 12 carbon atoms in the pendant group.

Examples of commercial polyacryls and polymethacryls include Gelva® 2497 (commercially available from Monsanto Co., St. Louis, Mo.), Duraplus® 2 (commercially available from Rohm & Haas Co., Philadelphia, Pa.), Joncryl® 95 (commercially available from S. C. Johnson Polymer, Sturtevant, Wis.), SCX-1537 (S. C. Johnson Polymer), SCX-1959 (S. C. Johnson Polymer), SCX-1965 (S. C. Johnson Polymer), Joncryl® 530 (S. C. Johnson Polymer), Joncryl®) 537 (S. C. Johnson Polymer), Glascol LS20 (commercially available from Allied Colloids, Suffolk, Va.), Glascol C37 (Allied Colloids), Glascol LS26 (Allied Colloids), Glascol LS24 (Allied Colloids), Glascol LE45 (Allied Colloids), Carboset® CR760 (commercially available from Noveon, Cleveland, Ohio), Carboset®

CR761 (Noveon), Carboset® CR763 (Noveon), Carboset® 765 (Noveon), Carboset® 19X2 (B1FGoodrich), Carboset® XL28 (Noveon), Hycar 26084 (Noveon), Hycar 26091 (Noveon), Carbobond 26373 (Noveon), Neocryl® A-601 (commercially available from Avecia Resins, Wilmington, Mass.) Neocryl® A-612 (Avecia Resins), Neocryl®A-6044 (Avecia Resins), Neocryl® A-622 (Avecia Resins), Neocryl® A-623 (Avecia Resins), Neocryl® A-634 (Avecia Resins), and Neocryl® A-640 (Avecia Resins). Vinyl acrylic copolymers Polyco 3220, available from Rohm and Haas are also useful as binders.

In another embodiment, the binder is a thermoplastic copolymer or terpolymer derived from ethylene or propylene and a functional monomer selected from the group consisting of alkyl acrylate, acrylic acid, alkyl acrylic acid, and combinations of two or more thereof. In one embodiment, the functional monomer is selected from alkyl acrylate, acrylic acid, alkyl acrylic acid, and combinations of two ore more thereof. In one embodiment, the binder is characterized by the absence of ethylene vinyl acetate resins, and acid or acid/acrylate-modified ethylene vinyl acetate resins. The alkyl groups in the alkyl acrylates and the alkyl acrylic acids typically contain 1 to about 8 carbon atoms, and, in one embodiment, 1 to about 2 carbon atoms. The functional monomer(s) component of the copolymer or terpolymer ranges from about 1 to about 15 mole percent, and, in one embodiment, about 1 to about 10 mole percent of the copolymer or terpolymer molecule. Examples include: ethylene/methyl acrylate copolymers; ethylene/ethylacrylate copolymers; ethylene/butyl acrylate copolymers; ethylene/methacrylic acid copolymers; ethylene/acrylic acid copolymers; anhydride-modified low density polyethylenes; anhydride-modified linear low density polyethylene, and mixtures of two or more thereof.

Ethylene acid copolymers are available from DuPont under the tradename Nucrel can also be used. These include Nucrel 0407, which has a methacrylic acid content of 4% by weight and a melting point of 109° C., and Nucrel 0910, which has a methacrylic acid content of 8.7% by weight and a melting point of 100° C. The ethylene/acrylic acid copolymers available from Dow Chemical under the tradename Primacor are also useful. These include Primacor 1430, which has an acrylic acid monomer content of 9.5% by weight, a melting point of about 97° C. and a $T_g$ of about −7.7° C. The ethylene/methyl acrylate copolymers available from Chevron under the tradename EMAC can be used. These include EMAC 2205, which has a methyl acrylate content of 20% by weight and a melting point of 83° C., and EMAC 2268, which has a methyl acrylate content of 24% by weight, a melting point of about 74° C. and a $T_g$ of about −40.6° C.

In one embodiment, the binder is a combination of a polyurethane and a polyacryl. In this embodiment, the polyurethane is typically present in an amount of about 10% to about 90%, or from about 20% to about 80%, or from about 30% to about 70% of the solids of the coating composition. The polyacryl is typically present in an amount of about 10% to about 90%, or from about 20% to about 80%, or from about 30% to about 70% of the solids of the coating composition. The ratio of the polyurethane to the polyacryl is from about 0.1 to about 9, or from about 0.25 to about 4, or from about 0.4 to about 2.5 to 1.

In another embodiment, the binder is a polyester. The polyester may be one or more of those disclosed for preparing the above polyurethanes. In another embodiment, polyesters are prepared from various glycols or polyols and one or more aliphatic or aromatic carboxylic acids also are useful film materials. Polyethylene terephthalate (PET) and PETG (PET modified with cyclohexanedimethanol) are useful film forming materials which are available from a variety of commercial sources including Eastman. For example, Kodar 6763 is a PETG available from Eastman Chemical. Another useful polyester from DuPont is Selar PT-8307 which is polyethylene terephthalate.

In another embodiment, the binder is a polyamide. Useful polyamide resins include resins available from EMS American Grilon Inc., Sumter, SC. under the general tradename Grivory such as CF6S, CR-9, XE3303 and G-21. Grivory G-21 is an amorphous nylon copolymer having a glass transition temperature of 125° C., a melt flow index (DIN 53735) of 90 ml/10 min and an elongation at break (ASTM D638) of 15. Grivory CF65 is a nylon 6/12 film grade resin having a melting point of 135° C., a melt flow index of 50 ml/10 min, and an elongation at break in excess of 350%. Grilon CR9 is another nylon 6/12 film grade resin having a melting point of 200° C., a melt flow index of 200 ml/10 min, and an elongation at break at 250%. Grilon XE 3303 is a nylon 6.6/6.10 film grade resin having a melting point of 200° C., a melt flow index of 60 ml/10 min, and an elongation at break of 100%. Other useful polyamide resins include those commercially available from, for example, Union Camp of Wayne, New Jersey under the Uni-Rez product line, and dimer-based polyamide resins available from Bostik, Emery, Fuller, Henkel (under the Versamid product line). Other suitable polyamides include those produced by condensing dimerized vegetable acids with hexamethylene diamine. Examples of polyamides available from Union Camp include Uni-Rez 2665; Uni-Rez 2620; Uni-Rez 2623; and Uni-Rez 2695.

In one embodiment, the binder is a polystyrene. Polystyrenes include homopolymers as well as copolymers of styrene and substituted styrene such as alpha-methyl styrene. Examples of styrene copolymers and terpolymers include: acrylonitrile-butene-styrene (ABS); styrene-acrylonitrile copolymers (SAN); styrene butadiene (SB); styrene-maleic anhydride (SMA); and styrene-methyl methacrylate (SMMA); styrene-alkly acrylate, etc. An example of a useful styrene copolymer is KR-10 from Phillip Petroleum Co. KR-10 is believed to be a copolymer of styrene with 1,3-butadiene. Another useful polystyrene is a copolymer of styrene and an alkyl acrylate in which the alkyl moiety has 1 to 6 carbon atoms. Butyl acrylate is especially useful as the comonomer of styrene. One particular commercially available source of the copolymer is the styrene/butyl acrylate copolymer dispersion available under the trademark ACRONAL S312D, S320D and S305D from BASF.

In one embodiment, the binder is a styrene- acryl copolymer. The acryl component is describe above. In one embodiment, the acryl may be an acrylic acid or ester, an acrylonitrile or their methacrylic analogs. Examples of the these resins include Microgel E-1002, E-2002, E-5002 (styrene acryl resin emulsion, available from Nippon Paint Co., Ltd.), Voncoat 4001 (acryl emulsion, available from Dainippon Ink & Chemicals, Inc.), Voncoat 5454 (styrene acryl resin emulsion, available from Dainippon Ink & Chemicals, Inc.), SAE 1014 (styrene acryl resin emulsion, available from Nippon Zeon Co., Ltd.), Saivinol SK-200 (acryl resin emulsion, available from Saiden Chemical Industry Co., Ltd.), Nanocryl SBCX-2821 (silicone-modified acryl resin emulsion, available from Toyo Ink Mfg. Co., Ltd.), Nanocryl SBCX-3689 (silicone-modified acryl resin emulsion, available from Toyo Ink Mfg. Co., Ltd.), #3070 (methacrylic acid methyl polymer resin emulsion, available from Mikuni Color Limited), SG-60 (styrene-acryl resin emulsion, available from Gifu Ceramic Co., Ltd.), Carboset GA series 1086, 2136, 1604 (styrene-acryl resin available from Noveon, formerly from B. F. Goodrich; Rhoplex B-15P, P-554 or P-376, available from Rohm and Haas and Grandol PP-1000 (Styrene-acryl resin emulsion, available from Dainippon Ink & Chemicals, Inc.).

Cationic Polymer

The coating composition also contains a cationic polymer. The cationic polymer fixes acid dye colorants in water-based inks, and diminishes dye diffusion. In one embodiment, the cationic polymer includes a quaternary ammonium polymer derived from the reaction of an epihalohydrin with an amine or a hydroxyalkylamine. In another embodiment, the amine is one or more of a dialkyl amine, ethylene diamine, and a polyalkylene polyamine.

The cationic polymer may be a polyamide with cationic functional groups, an amide-epichlorohydrin resin, a polyethyleneimine, a polyacrylamide with cationic functional groups, or an urea-formaldehyde resin.

The term "cationic polymer" is meant to include any water-soluble polymer containing cationic functional groups. For example, the cationic polymer may be an amide-epichlorohydrin polymer, a polyacrylamide with cationic functional groups, polyethyleneimine, polydiallylamine, a quaternary polycationic synthetic organic polymer, a polyacrylamide with cationic functional groups, or the like.

Examples of cationic polymers include polyalkyleneimines such as polyethyleneimines and polyisopropyleneimines, polyamines such as polyalkylene polyamines and amide-epichlorohydrin resins, polyamide polyamine epichlorohydrin, polyamides, water-soluble aniline resins and salts thereof, polythiourea and salts thereof, water-soluble cationic amino resins, polyvinyl pyridine and salts thereof, urea-formaldehyde resins and cationically modified polyacrylamide. These cationic polymers may be used either singly or in any suitable combination thereof.

The molecular weight of such a cationic polymer may be within a range of from about 3,000 to about 100,000 in terms of a weight average molecular weight. In one embodiment, the molecular weight ranges from about 5,000 to about 50,000, and in one from about 7,500 to about 20,000. The use of the cationic polymer having a molecular weight lower than about 3,000 may not be desirable, because the effect of the addition of the water-soluble polymer diminishes at lower molecular weights. On the other hand, the use of the cationic polymer having a molecular weight higher than about 100,000 may not be desirable because the viscosity of the resulting composition may increase to an unfavorable degree. As will be understood, such effects may vary depending on the other components of the composition.

The concentration of such a cationic polymer may be suitably determined as desired. In one embodiment, the concentration of the cationic polymer is within a range of generally from about 0.001% to about 20%, or from about 0.5% to about 15%, or from about 2% to about 13%, or from about 5% to about 12% by weight of the solids of the coating composition.

In one embodiment, the coating composition includes at least two water soluble, cationic polymers, namely, (1) a polymerized diallyldimethylammonium compound and (2) a copolymer of dimethylaminoethyl acrylate or methacrylate and at least one hydroxy-lower organic acrylate or methacrylate. In one embodiment, the hydroxy-lower organic acrylate is hydroxyethyl acrylate (HEA), and in another, it is hydroxyethyl methacrylate (HEMA).

Water soluble, cationic polymers useful in the practice of the present invention include, but are not limited to, quaternary ammonium polymers (also known as polyquatemary ammonium salts, polyquats and quaternary polymers). Non-limiting examples of quaternary ammonium polymers include polydiallyldimethylammonium compounds and copolymers of quaternary dimethylaminoethyl acrylate or methacrylate and one or more hydroxy-lower organic acrylate or methacrylate, for example, hydroxyethyl acrylate (HEA) and hydroxyethyl methacrylate (HEMA). To maintain charge neutrality, a monovalent or divalent counterion, Z, is associated with each quaternary ammonium center. Nonlimiting examples of such counterions include halides, (for example, chloride) and dimethylsulfate anion.

As used herein, the term "hydroxy-lower organic acrylate or methacrylate" refers to an acrylic or methacrylic acid ester, the ester group of which is a straight- or branched-chain alkyl, alkenyl, alkynyl or ether group containing from 1 to about 6 carbon atoms, substituted with at least one hydroxy group at a primary or secondary carbon. Nonlimiting examples of such groups include hydroxy-substituted methyl, ethyl, propyl, vinyl, allyl and propynyl groups.

In one embodiment, the water soluble, cationic polymer is poly(diallyldimethylammonium chloride) (PDADMAC), available from Ciba Geigy as a low, medium, or high molecular weight polymer. The chloride ions in PDADMAC can be exchanged for different monovalent or divalent counterions by, e.g., dissolving the polymer in a suitable solvent and passing the solution through an ion exchange resin. In another embodiment, the water soluble, cationic polymer is poly(diallyldimethylammonium dimethyl sulfate). One example of a poly(diallyl-dimethylammonium chloride) polymer is shown below:

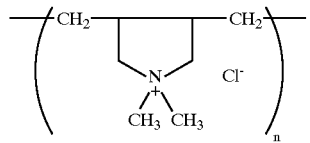

Other useful water soluble, cationic polymers include copolymers of quaternary dimethylaminoethyl acrylate or methacrylate and one or more hydroxy-lower organic acrylate or methacrylate, which have the general formula (I):

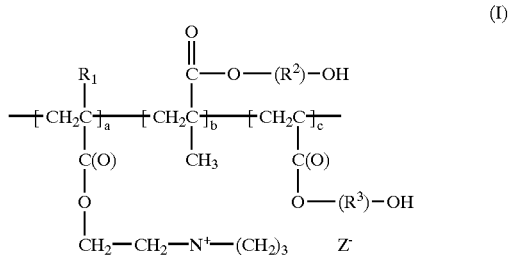

wherein $R^1$ is hydrogen or methyl; $(R^2)$—OH and $(R^3)$—OH are, independently, lower alkyl, alkenyl, alkynyl or ether substituted with a hydroxyl group at a 1° or 2° carbon; a>0; b>0; c>0, provided that b and c are not both zero; and Z is an anionic counterion. Such cationic polymers are disclosed in more detail in commonly assigned U.S. Pat. No. 6,153,288, the entire disclosure of which is incorporated herein by reference for its teachings relating to cationic polymers and relating to ink-receptive compositions and coated products.

Water soluble, cationic polymers of formula (I) can have a variety of geometries, depending on whether the individual monomers are polymerized head-to-head, head-to-tail, randomly, in fixed sequence (e.g., ABABAB . . . ), in blocks, or in some other manner. No specific geometric arrangement of monomers is intended by the formulas presented herein.

Copolymers of quaternary dimethylaminoethyl acrylate or methacrylate and one or more hydroxy-lower alkyl acrylate or methacrylate are prepared using standard polymerization techniques, for example, free radical polymerization. Thus, a terpolymer of quaternary dimethylaminoethyl acrylate (DMAEA), hydroxyethyl acrylate and hydroxyethyl methacrylate is readily made by heating a mixture of the monomers in the presence of a free radical initiator, optionally by varying the rate of addition of monomers and/or initiator to the reaction mixture. As but one nonlimiting example, a terpolymer of HEA, HEMA and quaternary DMAEA (with DMS as counterion), may comprise, on average, from about 18 to 37 HEA monomer units, 52 to 74 HEMA monomer units, and about 5 to 17 quaternary DMAEA monomer units.

Useful cationic polymers include, but are not limited to, quaternary ammonium compounds, phospholipids and polyquaternary polymers. In one embodiment, the cationic polymer is a polyquaternary cellulosic polymer. In one embodiment, the cationic polymer is a phospholipid, and in one the phospholipid is linoleamidopropylphosphotidyl PG dimoniumchloride, which has the general formula (II):

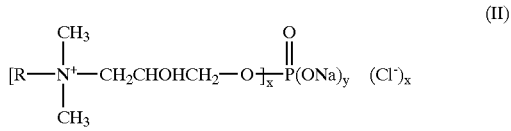

where R=linoleamidopropyl, and x+y=3, x≧1 and y≧1. This phospholipid is commercially available from MONA under the tradename PHOSPHOLIPID EFA.

In one embodiment, the quaternary ammonium polymer is a polyquaternary cellulosic polymer which is commercially available from AMERCHOL under the tradename POLYQUATERNIUM-10. The foregoing cationic polymers are disclosed in U.S. Pat. No. 6,093,447, the disclosure of which is incorporated herein by reference for its teachings relating to cationic polymers.

In one embodiment, a blend of two or more cationic polymers are used, in order to increase the number of different color dyes with which the composition can be used. In one embodiment, the two cationic polymers comprise a polyquaternary ammonium compound and a phospholipid. In one embodiment, the ratio of the two compounds is from about 10:1 to about 1:10 phospholipid to polyquaternium compound, and in one from about 8 to 1 to about 10 to 1.

In another embodiment, a cationic polymer such as poly(dimethylamine-co-epichlorohydrin) can be utilized as a cationic polymer in the present invention. This cationic polymer is shown in the formula below:

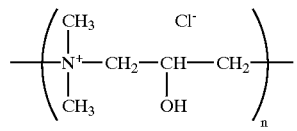

Adhesion Promoter

In one embodiment, the coating composition includes an adhesion promoter. In one embodiment, the adhesion promoter is present in the coating composition in an amount from about 0.5% to about 15%, or from about 1% to about 10%, or from about 2% to about 5% by weight of the solids of the coating composition.

In one embodiment, the adhesion promoter is at least one of a polyalkyleneimine or a hydroxyalkylated polyalkyleneimine. In one embodiment, the adhesion promoter is a polyamine compound, including, for example, triethylenetetramine, tetraethylenepentamine, pentaethylenehexamine, tripropylenetetramine and the like polyalkylene polyamines. Suitable polyalkylenimine compounds include, for example, polyethylenimine and polypropylenimine. The polyethylenimine is generally produced by polymerization of ethyleneimine and may not have an entirely linear structure, but instead may have a branched structure including primary, secondary and tertiary amino nitrogen atoms. However, any polyalkyleneimine species, either linear or branched, or even a species containing one or more nitrogen-containing heterocycles may be used effectively.

The polyethylenimines are identified as those polymers having a repeating unit of N—CH$_2$—CH$_2$—N, and may be homopolymers, or polymers formed by the reaction of polyethylenimine with ethylene oxide or epichlorohydrin. These compounds are cationic polymers having no unsaturation and no aziridine rings and can be used in a wide range of molecular weights. A poly(alkylenimine) may have a weight average molecular weight of about 400 to about 750,000. Examples of useful poly(alkylenimine) compounds are commercially available from many sources and include POLYMIN poly(ethylenimine) and LUPASOL poly(ethylenimine) available from BASF Corporation. A commercially available polyalkyleneimine is POLYMIN P® (a polyethyleneimine with a molecular weight of about 10,000 to about 100,000), available from BASF Aktiengesellschaft. Another commercially available polyalkylenimine is Lupasol SC 61B (having 35–40% solids, a pH of 12, and a calculated number average molecular weight of 110,000).

Additional useful adhesion promoters include organofunctional silanes having the following general formula (III):

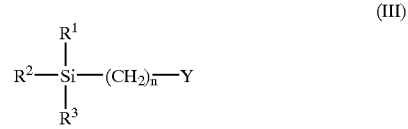

wherein $R^1$, $R^2$, and $R^3$ are selected from the group consisting of an alkoxy group and an alkyl group with the proviso that at least one alkoxy group is present, n is an integer from 0 to 4, and Y is an organofunctional group which may be one of chloro, methacryloxy, amino, glycidoxy, and mercapto. Useful silane coupling agents include such as γ-aminopropyl trimethoxysilane, vinyl triethoxy silane, vinyl tris(β-methoxy ethoxy)-silane, vinyl triacetoxy silane, γ-methacryloxypropyltrimethyoxy silane, γ-(β-amino ethyl)aminopropyl trimethoxysilane, and the like. A silane adhesion promoter may be present at levels of from 0.5 to 15% by weight of the total composition, and in one embodiment from about 4% to about 10% by weight.

Additional adhesion promoters include alkoxysilane polyalkylene-imine containing repeat units of the formula (IV):

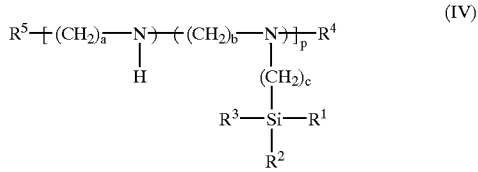

(IV)

wherein $R^5$ represents a bond to another nitrogen atom and $R^4$ represents a bond to another carbon atom or a hydrogen atom; a is from 1 to 8; b is from 1 to 8; c is from 1 to 6; at least one of $R^1$, $R^2$ and $R^3$ is a $C_1$–$C_6$ alkoxy group and any of $R^1$, $R^2$ and $R^3$ which are not alkoxy groups are $C_1$–$C_6$ alkyl groups and p is 1 or more, and x is 1–50.

In one embodiment, the alkoxysilane polyalkylene-imine is one in which c is 3 and specific examples of such compounds include dimethoxymethylsilylpropyl-polyethylene-imine (DMMSP-PEI hereafter), trimethoxysilylpropyl-polyethylene-imine (TMSP-PEI hereafter), and trimethoxysilylpropyl-diethylenetriamine (TMSP-DETA hereafter).

In TMSP-DETA a=2 and b=2 and x=1, c=3 and p=1 and $R^5=NH_2$ and $R^4=H$. TMSP-DETA has one Si atom and three nitrogen atoms, and a molecular weight of 245.

In DMMSP-PEI x=7 and p=4 and a=2 and b=2 and c=3. DMMSP-PEI has one Si for every seven nitrogen atoms, an Si functionality of 4, i.e., 4 Si atoms per molecule and a molecular weight of 2000. The nitrogen carrying the Si group also has a chlorine counter ion.

In TMSP-PEI the formula is the same as for DMMSP-PEI except that $R^1=R^2=R^3$=methoxy.

The alkoxysilane polyalkylene-imines used as adhesion promoters in the present invention are water soluble and in one embodiment have molecular weights not in excess of about 10,000. In one embodiment, p is not in excess of 50, e.g., in the range from 1 to about 50, in one from 1 to about 10, and in another from 1 to 4. In one embodiment, x may be in the range 1 to 50 or more, or from about 2 to about 10, or even from about 3 to about 7.

Comparing DMMSP-PEI with TMSP-DETA it will be noted that DMMSP-PEI has two hydrolysable groups on each Si atom whereas TMSP-DETA has three. The increased number of hydrolysable groups may contribute to adhesion. DMMSP-PEI has a large polymeric chain and this may anchor it more firmly to the binder and also contribute in a different way to adhesion. The foregoing adhesion promoters having the general formulae (III) and (IV) are disclosed in U.S. Pat. No. 5,693,127, the disclosure of which relating to adhesion promoters is incorporated herein by reference.

Optical Brightener

In one embodiment, the composition further includes an optical brightener. Optical brighteners are also referred to as fluorescent whitening agents. The optical brightener is used to improve the brightness or whiteness of the ink-receiving substrate formed by the composition of the present invention. Suitable brighteners include, for example, TINOPAL® available from Ciba Specialty Chemicals Corp., Stilbenes, which are water soluble, for example Phorwite BA solution, available from Bayer Chemical and Leucophor B 302 liquid available from Clariant.

In one embodiment, the optical brightener is visible, for example glows a blue color, under black light, for example from about 250 to about 400 nm.

Suitable brightening agents include, for example, stilbenes, coumarines, triazines or oxazoles or others known in the art. Various types of fluorescent brighteners are listed in KIRK-OTHMER, CONCISE ENCYCLOPEDIA OF CHEMICAL TECHNOLOGY, 4th Ed., Pp. 881.

An exemplary brightener, is disclosed in U.S. Pat. No. 5,976,410. The brightener disclosed in the '410 patent has the following general formula (V):

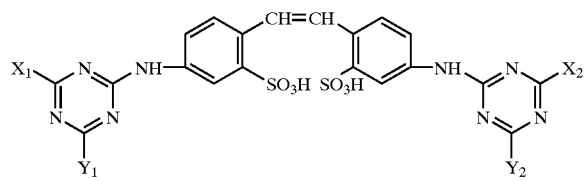

(V)

where $X_1$, $X_2$, $Y_1$ and $Y_2$ include a wide variety of possible substituents. Additional brighteners are disclosed, for example, in U.S. Pat. Nos. 4,482,496, 4,666,627, 4,904,794 and 5,779,741, all assigned to Ciba Specialty Chemicals Corp., Tarrytown, N.Y. These brighteners, and additional, similar brighteners are available from Ciba under the trademark TINOPAL®, for example, TINOPAL® SFP, or TINOPAL® PT. U.S. Pat. Nos. 4,482,496, 4,666,627, 4,904,794 and 5,779,741 are incorporated herein by reference for their teachings relating to synthesis and use of the fluorescent brighteners disclosed therein.

In another embodiment, the brightener is hexasodium-2.2'-[vinylenebis[3-sulfonato-4,1-(phenylene)imino[6-(diethylamino)-1,3,5-triazine-4,2-diyl]imino]]bis(benzene-1,4-disulphonate) which is sold by Ciba as TINOPAL® SFP. The structure of this compound is below in formula (VI):

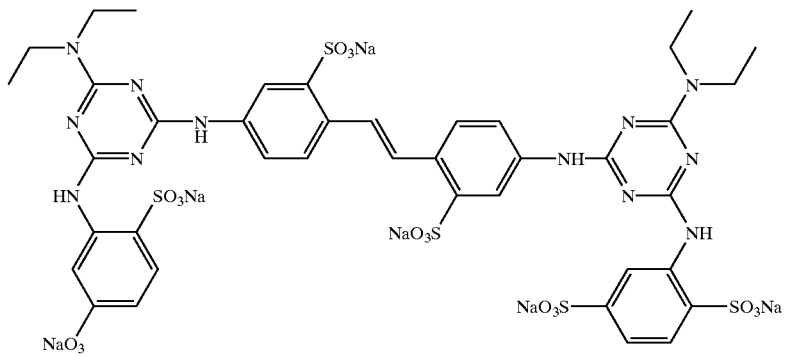

(VI)

The brightener or fluorescent whitening agent is added to the composition to increase the whiteness, brightness and blue color. While most fluorescent whitening agents would work to a certain degree, they should be stable in acid conditions and should be tolerant of the cationic components of the composition to give optimum results. Some fluorescent whitening agents do not fall into this category. Two products, however, that do are from the stilbene-triazine derivatives family. Products of this type are Ciba's TINO-PAL® HST and SCP liquids.

Additional brighteners are disclosed, for example, in U.S. Pat. No. 4,904,507, and include C.I. Fluorescent Brightener 28 which has the general formula (V), in which $X_1$ and $X_2$ are —NHR and $Y_1$ and $Y_2$ are —$NO_2$. C.I. Fluorescent Brightener 34 is an additional brightener disclosed in U.S. Pat. No. 4,904,507, which is incorporated herein by reference for its teachings relating to brighteners.

Additional brighteners are disclosed in U.S. Pat. No. 5,873,913, assigned to Clariant. These brighteners have the general formula (V) above, in which in which $X_1$ and $X_2$ are substituted benzene sulfonic acid groups and $Y_1$ and $Y_2$ are —$NR_2R_3$, where $R_2$ and $R_3$ may be H, alkyl, substituted alkyl, or an acid-bearing moiety, which may be, e.g., an amino acid. The disclosure of U.S. Pat. No. 5,873,913 is incorporated herein by reference for its teachings relating to brighteners.

Surfactant

In one embodiment, the composition further includes one or more cationic or nonionic surfactants, which help to wet the pigment and/or enhance print quality of the resulting composition. Non-limiting examples of nonionic surfactants include alkylphenol ethoxylates, such as nonylphenol ethoxylate, and Disponil A 3065, an ethoxylated nonionic surfactant available from Henkel of America Inc. (King of Prussia, Pa). Examples of nonionic surfactants include TRITON X-100, TRITON X-102, TRITON X-114, TRITON X-101, and TRITON CF-10 surfactants (all available from Union Carbide Corp.); SURFYNOL CT-136 (which is actually a mixture of anionic and nonionic surfactants), SURFYNOL 104, SURFYNOL 465, and SURFYNOL TG surfactants (all available from Air Products and Chemicals of Allentown, Pa.); and Tergitol NP-9 and Tergitol NP-10 surfactants (both available from Union Carbide Chemicals and Plastics Co. of Danbury, Conn.). Surfynol 104 DPM is particularly useful because it also act to control foaming. A non-limiting example of a cationic surfactant useful in the practice of the invention is hexadecyl trimethylammonium chloride (HDTMAC), available from Akzo Nobel Chemicals Inc. (Chicago, Ill.). Anionic surfactants should be avoided because of their likely electrostatic interaction with the cationic, water soluble polymer(s).

In one embodiment, up to about 10% by weight (on a dry weight basis) of one or more surfactants is employed in the ink-receptive composition. Too much surfactant can potentially cause the coating to have air bubbles, which could adversely effect print quality when coated on film substrates. The surfactants are generally present in an amount from about 0.1% to about 10%, or from about 0.5% to about 7%, or from about 1% to about 3% by weight of the solids of the coating composition.

The ink receptive layer may contain a UV light absorber or other light stabilizer. Among the UV light absorbers that are useful are the hindered amine absorbers available from Ciba-Geigy under the trade designation Tinuvin, especially those available under the designations Tinuvin 234, Tinuvin 326, Tinuvin 327 and Tinuvin 328. The light stabilizers that can be used include the hindered amine light stabilizers available from Ciba-Geigy under the trade designations Tinuvin 111, Tinuvin 123, Tinuvin 622, Tinuvin 770 and Tinuvin 783. Also useful light stabilizers are the hindered amine light stabilizers available from Ciba-Geigy under the trade designation Chimassorb, especially Chimassorb 119 and Chimassorb 944. The concentration of the UV light absorber and/or light stabilizer is in the range of up to about 2.5% by weight, and in one embodiment about 0.05% to about 1% by weight.

The topcoat layer and the facestock may contain an antioxidant. Any antioxidant useful in making thermoplastic films can be used. These include the hindered phenols and the organo phosphites. Examples include those available from Ciba-Geigy under the trade designations Irganox 1010, Irganox 1076 or Irgafos 168. The concentration of the antioxidant in the thermoplastic film composition is in the range of up to about 2.5% by weight, and in one embodiment about 0.05% to about 1% by weight.

The topcoat layer and the facestock may contain a metal deactivator. Any metal deactivator useful in making thermoplastic films can be used. These include the hindered phenol metal deactivators. Examples include those available from Ciba-Geigy under the trade designation Irganox 1024. The concentration of the metal deactivator in the thermoplastic film composition is in the range of up to about 1% by weight, and in one embodiment about 0.2% to about 0.5% by weight.

Other additives can be added as well to obtain a certain desired characteristic, such as waxes, defoamers, antioxidants, UV stabilizers, cross-linkers etc.

In one embodiment, the coating compositions optionally contain water or a other suitable diluent such as alcohol. The diluent is typically present in an amount from about 10% to about 90%, or from about 20% to about 80% by weight. The components of the present coating composition often contain solvent. The solvent provided by these components and the added solvent is the amount of solvent present in the coating composition.

The coatable, ink-receptive compositions of the present invention are particularly applicable to wide format products. Wide format products are generally manufactured as wide rolls (24 or more inches wide), and are roll-fed into large printers for imaging. They are typically employed in commercial settings, and include, for example, movie theater posters, outdoor signage, large advertisements, and the like. Narrow format products, by contrast, are generally manufactured as narrow rolls or individual sheets, and can be roll-fed or sheet-fed into printers for imaging. They are typically used in the office or home, and include, without limitation, computer printer paper, labels, transparencies, and the like.

Wide format and narrow format ink-receptive products differ not only in size, but also in ink capacity, durability, and other properties, and are often exposed to different use environments. For example, wide format products may encounter more ink per unit area when run through certain commercial printers. Problems with poor image quality, color bleed, and smearing are typical problems in wide format graphics applications.

Durability, including waterfastness, resistance to light-induced fading, abrasion resistance, color stability, and other properties also can differ between wide format and narrow format products. The present invention is intended to meet the more rigorous demands placed on wide format products, including products intended for outdoor use, as well as the durability demands placed on narrow format products. The present invention addresses the more rigorous demands placed on wide format products.

The ink receptive coating may be used in front lit, back lit or combination applications. In back lit applications, the substrate generally only contains a ink receptive layer, a print layer and possibly an overlaminate layer, discussed below. When used in a front lit application, the substrate has the ink receptive layer, print layer on one surface of the substrate and an adhesive layer on the other surface. Of course it is understood that an adhesive can still be used in a back lit application.

Referring to the drawings, FIG. 1 illustrates ink jet printable substrate 10 having a print receptive layer 11 derived from the coating compositions described herein and a substrate 12 which is adhered to the print receptive layer. The substrate may be directly adhered to the print receptive layer or may be adhered through a tie layer or adhesive. The substrates useful in the practice of the present invention include paper, cardboard, corrugated board, plastic film, and metal film or foil face stocks and label stocks traditionally used for ink printing applications, particularly ink jet printing. Self-wound materials and other linerless products are also suitable substrates, for example, self-wound tapes. Examples of paper face stocks suitable for use with the present invention include offset, bond, text, cover, index, lightweight printing paper, litho paper, and sulfite paper. Examples of plastic face stocks suitable for use with the present invention include polystyrene, polyvinyl chloride, polyester, nylon and polyolefin (for example, polyethylene) films. The films may be monlayer films or multilayer films.

Polymer blends are also suitable for use as the coatable substrate for the present invention. Such films may be cast, extruded, or coextruded. For example, a film substrate comprising a coextruded polyolefin-polybutylene terephthalate sandwich can be used in the present invention. A further example of a coatable substrate is a metal face stock such as aluminum foil.

The topcoat compositions are applied to any substrate to make an ink receptive media. The materials useful as the substrate layer and as the layer or layers in contact with the topcoat include cellulose based substrates such as paper, film based substrates, such as polyolefin films, polyester films, polyamide films and polyurethane films, and cellulose based substrates that have been coated with film forming materials derived from polyolefins, polyesters, polyamides and polyurethanes. The substrates are generally from 1.5 to about 10, or from about 2 to about 9, or from about 2.5 to about 8 mils thick. A sample of substrates which may be used includes paper stocks as well as film stocks such as Fasclear, Primax, Mirage and Graphics XL cast vinyl, MX calendared vinyl many of which are available from Avery Dennison Corporation. Examples of useful substrates includes polyester films, such as a 7 mil polyethyleneterephthalate (PET) film and 4 mil white PET film; vinyl halide film, such as 3.2 mil polyvinyl chloride film, including those which are calendared; and 4 mil polyethylene film.

Figure 2:
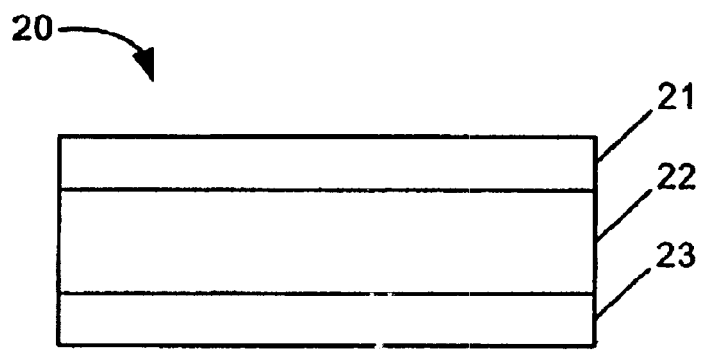
FIG. 2 is a cross-section of an ink jet printable having an ink receptive layer and a substrate, also having an opacity improving layer.

In one embodiment, the film has a print layer 21. As illustrated in FIG. 2, substrate 23 is adhered to print receptive layer 22. Print receptive layer 22 in turn is printed with print layer 21. It should be noted that print layer 21 can completely cover ink receptive layer 22, or can partially cover print receptive layer 22.

Figure 3:
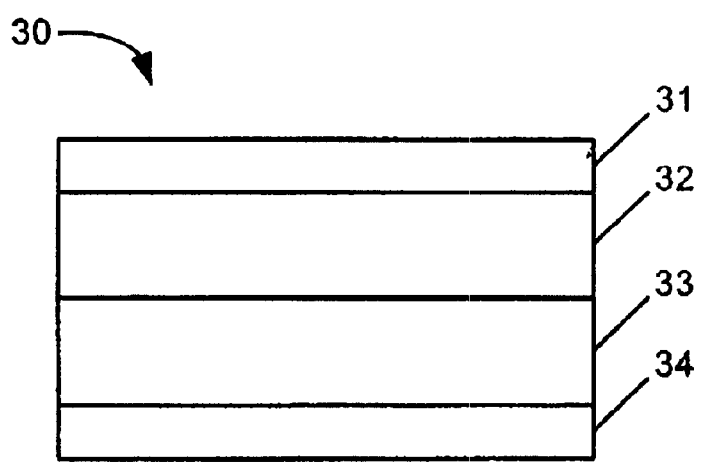
FIG. 3 is a cross-section of an ink jet printable having an ink receptive layer, a substrate and an adhesive, optionally with a releasable liner.

Referring to FIG. 3, ink printable article 30 has an ink receptive layer 31 adhered to substrate 32. Substrate 32 is in term adhered to an adhesive layer 33. The adhesive layer 33 is in releaseable contact with release liner 34. The adhesive layer may be directly bonded to the substrate or bonded indirectly to the substrate. Indirect adhesion is typically through a tie or adhesive improving layer.

Coatable label stocks useful in the practice of the present invention include, for example, a variety of printable label constructions or assemblies well known in the art, each typically comprising a label face stock (sheet or roll) having at least one inner and at least one outer surface, a pressure-sensitive adhesive (PSA) adhered to at least one inner surface of the label face stock, and a removable release liner abutting the PSA, the entire assembly forming a sandwich-like construction.

An ink-receptive coated product is easily made by applying an ink-receptive composition as described above to one or both surfaces of a face stock or label stock, using a conventional coating or other application technique. Examples of such techniques include slot die, air knife, brush, curtain, extrusion, blade, floating knife, gravure, kiss roll, knife-over-blanket, knife-over-roll, offset gravure, reverse roll, reverse-smoothing roll, rod, and squeeze roll coating. The ink-receptive composition can also be applied to paper substrates in a size press, during paper manufacture. For label products, the composition can be applied using any conventional technique or process including, for example, coating "on-press" during the converting process (e.g., in concert with the processes of die-cutting, matrix stripping, etc.), coating off-press using a separate coater, and other application methods.

The ink receptive composition is coated onto the substrate. It should be noted these substrates may be individual paper or film face stocks or may also be multilayer constructions. The multilayer constructions may be coextruded or laminated articles which are useful for printing applications. These articles include those that have adhesive layers. These articles are useful as label and graphic stocks.

The topcoat can be coated onto substrates in various manners, for instance by means of engraving coating, off-set coating, a casting process or by (co)extrusion. The choice for a certain production method depends strongly on the raw material characteristics and on the desired thickness of the coating.

Drying of a water or diluent based system can be done by the usual thermal drying techniques, by means of microwaves or infrared drying. Solvent-less systems can be cured thermally, by means of UV curing or Electron Beam curing.

The coating is typically applied in the following manner. A coating composition, which is a solution, dispersion or emulsion containing one (or more) binder(s) and one or more fillers is applied to a film or paper by means of techniques known in the industry. In a ventilated oven the diluent or water is evaporated, after which a top layer with the desired thickness is obtained. If desired one or more layers between the film or paper and the coating can be provided. These may serve to obtain certain desired additional characteristics, such as a desired color, opacity etc.

When the composite film or paper according to the invention has to be used as a label, the film or paper can be provided with an adhesive layer at the side that is not covered with the topcoat. This adhesive layer may consist of a pressure sensitive adhesive or a heat activated adhesive. All adhesives can be used. The adhesives may be premanent or removable. Additionally the film or paper can be used without an adhesive layer, being the case in in-mold labeling. A primer coating may be used to improve adhesive to between the substrate and the topcoats.

The compositions are prepared generally at ambient temperatures by ordinary mixing means. For example, the ingredients are mixed at about 300 to about 550 rpm for about 5 to 60 minutes in a Cowel blade mixer. In one embodiment, the compositions are prepared by pre-mixing the binder and cationic polymer before addition of the filler. If other additives are used they are generally mixed prior to the introduction of the filler to the composition.

The following examples relate to coating compositions and their preparation. These examples are illustrative and not intended to be limiting in scope. Unless otherwise indicated, the temperature is ambient temperature, the pressure is atmospheric pressure, amounts are by weight and the temperature is in degrees Celsius.

EXAMPLE 1

A reaction vessel is charged with 22 parts of deionized water. To the vessel is added 16 parts of Airflex 410 with stirring. Then, Agefloc A50 (7.2 parts) and Syloid W-300 (38.4 parts) were added with stirring. The mixture is stirred for an additional three minutes to yield a coating composition having 35.5% solids.

EXAMPLE 2–10

The following table contain further examples of coating compositions. These coating compositions are prepared as described in Example 1.

without the entrapment of air bubbles, creases or other defects that might spoil the appearance of the finished article or image. The deleterious effects of ambient humidity may be slowed by the overlamination of a transparent protective coat or sheet herein referred to as an overlaminate. Overlamination has the further advantage that the images are protected from scratching, splashes, and the overlaminate can supply a high gloss finish or other desired surface finish or design, and provide a degree of desired optical dot-gain. The overlaminate layer may also absorb ultraviolet radiation or protect the underlayers and image from deleterious effects of direct sunlight or other sources of radiations. Overlamination is, for example, described in U.S. Pat. No. 4,966,804. This patent is incorporated herein by reference.

After printing an image or design onto the receptor layers of the present invention, the image is overlaminated with a transparent colorless or nearly colorless material. Suitable overlaminate layers include any suitable transparent plastic material bearing on one surface an adhesive. The adhesive of the overlaminate layer could be a hot-melt or other thermal adhesive or a pressure-sensitive adhesive. The surface of the overlaminate layer can provide high gloss or matte or other surface texture. The overlaminate layers are designed for

|  | 2 | 3 | 4 | 5 | 6 | 7 | 8 | 9 | 10 | 11 | 12 |
|---|---|---|---|---|---|---|---|---|---|---|---|
| Binders |  |  |  |  |  |  |  |  |  |  |  |
| Airflex 410 | — | — | 16 | 16 | 16 | 12 | 17.27 | 16.59 | — | 16.9 | 16.9 |
| Airvol A50 | 17 | — | 6.1 | — | — | 6 | 14.25 | 6.08 | 10 | 6.08 | 6.08 |
| Sancure 2026 | — | 15 | — | — | 4 | — | — | — | 10 | — | — |
| Fillers |  |  |  |  |  |  |  |  |  |  |  |
| Airwhite AW5 | 35 | — | — | — | 44 | — | — | — | — | — | — |
| Syloid W-300 | — | 38 | 38.7 | 38.6 | — | 35 | 38.5 | 38.6 | 38.7 | 45 | 45 |
| Cationic Polymers |  |  |  |  |  |  |  |  |  |  |  |
| Agefloc A50[1] | — | 7.5 | 7.3 | 7.3 | — | 8 | 6.84 | 7.30 | 7.5 | 7.30 | 7.3 |
| Agefloc WT20VHV | 8 | — | — | — | 7.5 | — | — | — | — | — | — |
| Additives |  |  |  |  |  |  |  |  |  |  |  |
| Lupersol SC-61B | — | — | 2.5 | — | — | — | 2.05 | 2.47 | 2.3 | 2.47 | 2.47 |
| Polyacrlyamide[2] | — | — | — | 5.8 | — | — | 4.94 | 5.84 | 6.1 | 5.84 | 5.84 |
| Surfonyl 104DPM | — | — | — | — | 1.5 | — | 1.14 | 1.46 | 1.3 | 1.46 | 1.46 |
| Tinopal SFP | — | — | — | — | — | 0.3 | — | 0.27 | 0.5 | — | 0.18 |
| Water | 22 | 22 | 22 | 22 | 22 | 22 | 13.82 | 21.26 | 22 | 20.99 | 21.22 |
| Percentage of Solids in Examples 2–12 | | | | | | | | | | | |
|  | 2 | 3 | 4 | 5 | 6 | 7 | 8 | 9 | 10 | 11 | 12 |
| Total Parts | 81.5 | 82.5 | 90.1 | 89.7 | 95.0 | 83.3 | 100 | 100 | 98.4 | 100 | 100 |
| Parts Solid | 40.7 | 26.85 | 32.39 | 34.32 | 56.65 | 28.05 | 36.65 | 36.49 | 32.62 | 36.5 | 36.5 |
| % Solids | 49.9 | 32.5 | 35.9 | 38.3 | 59.6 | 33.7 | 36.6 | 36.5 | 33.2 | 36.5 | 36.5 |

[1]Agefloc A-50 poly (Hydroxyalkene Ammonium Chloride), from C.P.S. Chemicals of Old Bridge, N.J.
[2]50% solution in water available commercially from Aldrich Chemical.

Overlaminated Product

Figure 4:
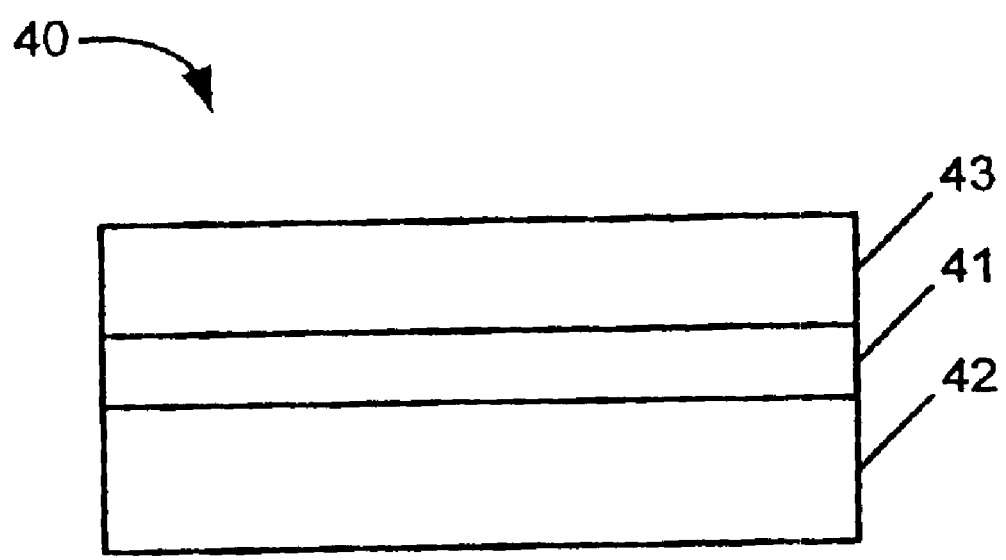
FIG. 4 is a cross section of an ink jet printable having an ink receptive layer and a substrate, also having an opacity improving layer and an overlaminate layer.

In another embodiment, the substrate with the ink receptive coating is printed with ink. Referring to FIG. 4, an ink printable article 40 has an ink receptive layer 41 on substrate 42. This article is printed with ink jet inks and then overlaminate 43 is placed onto the article. The overlaminate comprises an overlaminate film and an adhesive.

In this application, overlaminate layer refers to any sheet material that can be adhered to the surface of any existing coated or uncoated sheet material. "Overlamination" refers to any process of achieving this adherence, particularly external graphics applications and include materials such as those commercially available from Avery Dennison as DOL 1000 (2.1 mil clear cast vinyl film) or DOL 4000 (clear polyester film) Digital Overlaminate.

In one embodiment, an overlaminate protective layer overlies the ink jet ink. This provides the imaged receptor laminate with enhanced durability and abrasion resistance. In embodiments wherein the print layer does not cover the entire surface of the print receptive layer to which it is adhered, the overlaminate protective layer adheres to the image in the covered portions and the print receptive layer in the non-covered portions.

The overlaminate protective layer can be comprised of a thermoplastic film and a pressure sensitive or heat-activatable adhesive adhered to one side of the film. The thermoplastic film of the overlaminate protective layer may have a single layer or a multilayered structure. It can be comprised of a thermoplastic polymer that can be: a polyolefin; an ionomer resin derived from sodium, lithium or zinc and ethylene/methacrylic acid copolymers; an ethylene acrylic or methacrylic acid copolymer; an ethylene-vinylacetate terpolymer wherein the termonomer is acrylic acid, methyl acrylate or maleic anhydride; a polymethyl-methacrylate; a fluoropolymer or a polyester.

The polyolefins that can be useful include polyethylene, polypropylene or polybutylene or copolymers of ethylene, propylene or butylene with an alpha olefin. The alpha olefin, is selected from those alpha olefins containing from 2 to about 18 carbon atoms, and in one embodiment 2 to about 12 carbon atoms, and in one embodiment 2 to about 8 carbon atoms including ethylene, butylene, hexene and octene. Medium density polyethylenes and the linear medium density polyethylenes are useful. Useful polyolefins include those prepared using a Ziegler-Natta catalyst or a metallocene catalyst. An example of the useful polyolefin is available from Dow Chemical under the trade designation Affinity 1030HF, which is identified as a metallocene catalyst catalyzed octene-ethylene copolymer.

The ionomer resins available from DuPont under the tradename Surlyn can be used. These resins are identified as being derived from sodium, lithium or zinc and copolymers of ethylene and methacrylic acid. Included in this group are: Surlyn 1601, which is a sodium containing ionomer; Surlyn 1605, which is a sodium containing ionomer; Surlyn 1650, which is a zinc containing ionomer; Surlyn 1652, which is a zinc containing ionomer; Surlyn 1702, which is a zinc containing ionomer; Suryin 1705–1, which is a zinc containing ionomer; Surlyn 1707, which is a sodium containing ionomer; Surlyn 1802, which is a sodium containing ionomer; Surlyn 1855, which is a zinc containing ionomer; Surlyn 1857, which is a zinc containing ionomer; Surlyn 1901, which is a sodium containing ionomer; Surlyn AD-8546, which is a lithium containing ionomer; Surlyn AD-8547, which is a zinc containing ionomer; Surlyn AD-8548, which is a sodium containing ionomer; Surlyn 7930, which is a lithium containing ionomer; Surlyn 7940, which is a lithium containing ionomer; Surlyn 8020, which is a sodium containing ionomer; Surlyn 8140, which is a sodium containing ionomer; Surlyn 8528, which is a sodium containing ionomer; Surlyn 8550, which is a sodium containing ionomer; Surlyn 8660, which is a sodium containing ionomer; Surlyn 8920, which is a sodium containing ionomer; Surlyn 8940, which is a sodium containing ionomer; Surlyn 9120, which is a zinc containing ionomer; Surlyn 9650, which is a zinc containing ionomer; Surlyn 9730, which is a zinc containing ionomer; Surlyn 9910, which is a zinc containing ionomer; Surlyn 9950, which is a zinc containing ionomers; and Surlyn 9970, which is a zinc containing ionomer.

The ethylene acrylic or methacrylic acid copolymers that can be used include those available from DuPont under the tradename Nucrel. These include Nucrel 0407, which has a methacrylic acid content of 4% by weight and a melting point of 109° C., and Nucrel 0910, which has a methacrylic acid content of 8.7% by weight and a melting point of 100 C. The ethylene/acrylic acid copolymers available from Dow Chemical under the tradename Primacor are also useful. These include Primacor 1430, which has an acrylic acid monomer content of 9.5% by weight and melting point of 97° C.

The fluoropolymers which are useful as the overlaminate include the Teflon films available from DuPont. Example of commercially available overlaminates containing fluoropolymers are DOL-5000 and DOL 50001 overlaminate of Avery Dennison Corporation.

The polyester which may be used in the overlaminates are described above.

The concentration of the thermoplastic polymer in the thermoplastic film of the overlaminate protective film layer is generally at least about 30% weight, and in one embodiment about 30% to about 99.5% weight, and in one embodiment about 75% to about 99.5% by weight.

The thermoplastic film of the overlaminate protective layer may, and preferably does, contain a UV light absorber or other light stabilizer. These include the UV light absorbers and light stabilizers described above as being used in the core layer and the skin layers of the receptor laminate. Among the UV light absorbers that are useful are the hindered amine absorbers available from Ciba-Geigy under the trade designation Tinuvin, especially those available under the designations Tinuvin 234, Tinuvin 326, Tinuvin 327 and Tinuvin 328. The light stabilizers that can be used include the hindered amine light stabilizers available from Ciba-Geigy under the trade designations Tinuvin 111, Tinuvin 123, Tinuvin 622, Tinuvin 770 and Tinuvin 783. Also useful light stabilizers are the hindered amine light stabilizers available from Ciba-Geigy under the trade designation Chimassorb, especially Chimassorb 119 and Chimassorb 944. The concentration of the UV light absorber and/or light stabilizer in the thermoplastic film composition is in the range of up to about 2.5% by weight, and in one embodiment about 0.05% to about 1% by weight.

The thermoplastic film of the overlaminate protective layer may contain an antioxidant. Any antioxidant useful in making thermoplastic films can be used. These include the hindered phenols and the organo phosphites. Examples include those available from Ciba-Geigy under the trade designations Irganox 1010, Irganox 1076 or Irgafos 168. The concentration of the antioxidant in the thermoplastic film composition is in the range of up to about 2.5% by weight, and in one embodiment about 0.05% to about 1% by weight.

The thermoplastic film of the overlaminate protective layer may contain a metal deactivator. Any metal deactivator useful in making thermoplastic films can be used. These include the hindered phenol metal deactivators. Examples include those available from Ciba-Geigy under the trade designation Irganox 1024. The concentration of the metal deactivator in the thermoplastic film composition is in the range of up to about 1% by weight, and in one embodiment about 0.2% to about 0.5% by weight.

The thickness of the thermoplastic film of the overlaminate protective layer is generally in the range of about 0.5 to about 5 mils, and in one embodiment about 1 to about 3 mils. The pressure sensitive or heat-activatable adhesive that is adhered to the thermoplastic film of the overlaminate protective layer may be any of the pressure sensitive or heat-activatable adhesives. An especially useful pressure sensitive adhesive is Aeroset 1460. An especially useful heat-activatable adhesive is Elvax 3185. The pressure sensitive or heat-activatable adhesive may be blended with one or more of the UV light absorbers, light stabilizers, antioxidants and/or metal deactivators described above as being useful in making the thermoplastic film of the overlaminate protective film layer. These additive materials are typically added to the pressure sensitive or heat-activatable adhesive composition at concentrations of up to about 2.5% by weight for each of the additive materials based on the overall weight of the pressure sensitive or heat-activatable adhesive composition, and in one embodiment about 0.05 to about 1% by weight.

The thickness of the pressure sensitive or heat-activatable adhesive of the overlaminate protective layer is generally in the range of about 0.25 mil to about 2 mils, and in one embodiment about 0.5 mil to about 1 mil. In one embodiment, the coat weight of this pressure sensitive or heat-activatable adhesive is generally in the range of about 10 gsm to about 50 gsm, and in one embodiment about 20 gsm to about 35 gsm.

The overlaminate protective layer is adhered to the imaged receptor laminate by contacting the film layer and the laminate using known techniques. The pressure sensitive or heat-activatable adhesive of the overlaminate protective layer contacts the imaged receptor laminate and adheres the film layer to the laminate.

Prior to adhering the overlaminate protective layer to the imaged receptor laminate, the overlaminate protective layer may be provided with a release liner overlying its pressure sensitive adhesive layer. The use of the release liner facilitates the handling of the overlaminate protective layer. During the step of adhering the overlaminate protective layer to the laminate, the release liner is stripped from the overlaminate protective layer, thus exposing the pressure sensitive adhesive. Any release liners can be used.

Alternatively, the first surface of the overlaminate protective layer can be release coated to permit a self-wound roll structure, wherein the pressure sensitive or heat-activatable adhesive coated second surface of the overlaminate protective layer is wound in contact with the release coated first surface of said overlaminate protective layer. The release coating composition can be any release coating composition known in the art. Silicone release coating compositions are preferred, and any of the silicone release coating compositions which are known in the art can be used. The major component of the silicone release coating is a polyorganosiloxane and more often, polydimethylsiloxane. The silicone release coating compositions used in this invention may be room temperature cured, thermally cured, or radiation cured. Generally, the room temperature and thermally curable compositions comprise at least one polyorganosiloxane and at least one catalyst (of curing agent) for such polyorganosiloxane(s). Such compositions may also contain at least one cure accelerator and/or adhesion promoter (sometimes referred to as an anchorage additive). As is known in the art, some materials have the capability of performing both functions, i.e., the capability of acting as a cure accelerator to increase the rate, reduce the curing temperature, etc., and also as an adhesion promoter to improve bonding of the silicone composition to the substrate. The use of such dual function additives where appropriate is within the purview of the invention.

The release coating compositions are applied to the overlaminate protective layer using known techniques. These include gravure, reverse gravure, offset gravure, roller coating, brushing, knife-over roll, metering rod, reverse roll coating, doctor knife, dipping, die coating, spraying curtain coating, and the like. The coat weight is in the range of about 0.1 grams per square meter (gsm) to about 10 gsm or more, and in one embodiment about 0.3 gsm to about 2 gsm. In one embodiment, the thickness or caliper of the resulting release-coated substrate may range from 5 about 0.5 mil to about 10 mils, and in one embodiment from about 1 mil to about 6 mils.

The following examples relates to overlaminates which are useful in the present invention.

EXAMPLE O-1

An overlaminate includes

Face Film: 2.1 mil clear, high gloss, premium cast vinyl film

Avery Dennison Adhesive: s-652 permanent, clear, acrylic, pressure-sensitive

Release Liner: 78# Bleached Kraft

EXAMPLE O-2

An overlaminate includes

Face Film: 2.1 mil clear, matte, premium, cast vinyl film

Avery Dennison Adhesive: S-652 permanent, clear, acrylic, pressure-sensitive

Release Liner: 78# Bleached Kraft

EXAMPLE O-3

An overlaminate includes

Face Film: 3.1 flexible, clear, semi-gloss calendered vinyl film

Avery Dennison Adhesive: S-652 permanent, clear, acrylic, pressure-sensitive

Release Liner: 78# Bleached Kraft

EXAMPLE O-4

An overlaminate includes

Face Film: 1.0 mil clear, high gloss, premium, cast fluoropolymer DuPont Teflon film Avery Dennison Adhesive: S-659 permanent, clear, acrylic, pressure-sensitive Release Liner: 78

The following examples relate to the ink printable article of the present invention.

EXAMPLE I a) An ink printable article useful for wide format thermal and piezo ink jet printers is prepared by coating a 3.4 mil flexible white calendered vinyl film with the product of example 1 on one surface. To this product is laminated a Avery Dennison S-652 permanent, clear, acrylic pressure-sensitive adhesive on a 90# StaFlat liner. The adhesive is placed on the opposite side of the film than the ink receptive coating.

b) The product of part a) is printed with an ink jet image and this product is overlaminated with the overlaminate of Example O-1.

EXAMPLE II a) An ink printable article useful as with wide format thermal and piezo ink jet printers, is prepared as described in Example I using a 3.4 mil flexible white calendered vinyl film, Avery Dennison R-196 removable, clear, acrylic pressure-sensitive adhesive, and 90# StaFlat release liner.

b) The product of part a) is printed with an ink jet image and this product is overlaminated with the overlaminate of Example O-2.

EXAMPLE III a) An ink printable article useful with wide format thermal and piezo ink jet printers, 7 mil DuPont Tejin Film Melinex translucent base material is coated with the product of Example 1.

b) The product of part a) is printed with an ink jet image and this product is overlaminated with the overlaminate of Example O-2.

EXAMPLE IV a) An ink printable article useful with wide format thermal and piezo ink jet printers, 4 mil DuPont Tejin Film Melinex polyester base material is coated with the product of Example 1.

b) The product of part a) is printed with an ink jet image and this product is overlaminated with the overlaminate of Example O-2.

EXAMPLE V a) An ink printable article useful with wide format thermal and piezo ink jet printers, 9 mil flexible white polyolefin film is coated with the product of Example 1.

b) The product of part a) is printed with an ink jet image and this product is overlaminated with the overlaminate of Example O-2.

EXAMPLE VI a) An ink printable article useful for wide format thermal and piezo ink jet printers is prepared by coating a 3.4 mil flexible white calendered vinyl film with the product of example 8 on one surface. To this product is laminated a Avery Dennison S-652 permanent, clear, acrylic pressure-sensitive adhesive on a 90# StaFlat liner. The adhesive is placed on the opposite side of the film than the ink receptive coating.

b) The product of part a) is printed with an ink jet image and this product is overlaminated with the overlaminate of Example O-1.

EXAMPLE VII a) An ink printable article useful as with wide format thermal and piezo ink jet printers, is prepared as described in Example VI using a 3.4 mil flexible white calendered vinyl film, Avery Dennison R-196 removable, clear, acrylic pressure-sensitive adhesive, and 90# StaFlat release liner.

b) The product of part a) is printed with an ink jet image and this product is overlaminated with the overlaminate of Example O-2.

EXAMPLE VIII a) An ink printable article useful with wide format thermal and piezo ink jet printers, 7 mil DuPont Tejin Film Melinex translucent base material is coated with the product of Example 8.

b) The product of part a) is printed with an ink jet image and this product is overlaminated with the overlaminate of Example O-2.

EXAMPLE XI a) An ink- printable article useful with wide format thermal and piezo ink jet printers, 4 mil DuPont Tejin Film Melinex polyester base material is coated with the product of Example 8.

b) The product of part a) is printed with an ink jet image and this product is overlaminated with the overlaminate of Example O-2.

EXAMPLE X a) An ink printable article useful with wide format thermal and piezo ink jet printers, 9 mil flexible white polyolefin film is coated with the product of Example 8.

b) The product of part a) is printed with an ink jet image and this product is overlaminated with the overlaminate of Example O-2.

EXAMPLE XI a) An ink printable article useful for wide format thermal and piezo ink jet printers is prepared by coating a 3.4 mil flexible white calendered vinyl film with the product of example 11 on one surface. To this product is laminated a Avery Dennison S-652 permanent, clear, acrylic pressure-sensitive adhesive on a 90# StaFlat liner. The adhesive is placed on the opposite side of the film than the ink receptive coating.

b) The product of part a) is printed with an ink jet image and this product is overlaminated with the overlaminate of Example O-1.

EXAMPLE XII a) An ink printable article useful as with wide format thermal and piezo ink jet printers, is prepared as described in Example XI using a 3.4 mil flexible white calendered vinyl film, Avery Dennison R-196 removable, clear, acrylic pressure-sensitive adhesive, and 90# StaFlat release liner.

b) The product of part a) is printed with an ink jet image and this product is overlaminated with the overlaminate of Example O-2.

EXAMPLE XIII a) An ink printable article useful with wide format thermal and piezo ink jet printers, 7 mil DuPont Tejin Film Melinex translucent base material is coated with the product of Example 11.

b) The product of part a) is printed with an ink jet image and this product is overlaminated with the overlaminate of Example O-2.

EXAMPLE XIV a) An ink printable article useful with wide format thermal and piezo ink jet printers, 4 mil DuPont Tejin Film Melinex polyester base material is coated with the product of Example 11.

b) The product of part a) is printed with an ink jet image and this product is overlaminated with the overlaminate of Example O-2.

EXAMPLE XV a) An ink printable article useful with wide format thermal and piezo ink jet printers, 9 mil flexible white polyolefin film is coated with the product of Example 12.

b) The product of part a) is printed with an ink jet image and this product is overlaminated with the overlaminate of Example O-2.

EXAMPLE XVI a) An ink printable article useful for wide format thermal and piezo ink jet printers is prepared by coating a 3.4 mil flexible white calendered vinyl film with the product of example 12 on one surface. To this product is laminated a Avery Dennison S-652 permanent, clear, acrylic pressure-sensitive adhesive on a 90# StaFlat liner. The adhesive is placed on the opposite side of the film than the ink receptive coating.

b) The product of part a) is printed with an ink jet image and this product is overlaminated with the overlaminate of Example O-1.

EXAMPLE XVII a) An ink printable article useful as with wide format thermal and piezo ink jet printers, is prepared as described in Example XV using a 3.4 mil flexible white calendered vinyl film, Avery Dennison R-196 removable, clear, acrylic pressure-sensitive adhesive, and 90# StaFlat release liner.

b) The product of part a) is printed with an ink jet image and this product is overlaminated with the overlaminate of Example O-2.

EXAMPLE XVIII a) An ink printable article useful with wide format thermal and piezo ink jet printers, 7 mil DuPont Tejin Film Melinex translucent base material is coated with the product of Example 12.

b) The product of part a) is printed with an ink jet image and this product is overlaminated with the overlaminate of Example O-2.

EXAMPLE XIX a) An ink printable article useful with wide format thermal and piezo ink jet printers, 4 mil DuPont Tejin Film Melinex polyester base material is coated with the product of Example 12.

b) The product of part a) is printed with an ink jet image and this product is overlaminated with the overlaminate of Example O-2.

EXAMPLE XX a) An ink printable article useful with wide format thermal and piezo ink jet printers, 9 mil flexible white polyolefin film is coated with the product of Example 12.

b) The product of part a) is printed with an ink jet image and this product is overlaminated with the overlaminate of Example O-2.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An ink-receptive composition, comprising: (a) a filler; (b) a binder, comprising a homopolymer, copolymer or terpolymer of a vinyl alcohol, a vinyl acetate, a vinyl chloride or combinations of two or more thereof; (c) at least one quaternary ammonium polymer and (d) at least one hydroxyalkylated polyalkyleneimine, wherein the composition, when coated on a substrate, forms an ink-receptive coating which accepts ink loading greater than about 300%.

2. The composition of claim 1 wherein the binder is a copolymer or terpolymer derived from an olefin and a vinyl alcohol, a vinyl acetate, a vinyl chloride or combination thereof.

3. The composition of claim 2 wherein the olefin contains from 2 to about 8 carbon atoms.

4. The composition of claim 2 wherein the olefin is ethylene or propylene.

5. The composition of claim 1 wherein the binder is a copolymer of ethylene and vinyl acetate.

6. The composition of claim 1 wherein the filler is silica, silicic acid, clays, zeolites, alumina, an alkaline earth metal sulfate or carbonate, an alkaline earth or transition metal oxide or hydroxide, or combinations thereof.

7. The composition of claim 1 wherein the filler is a silica.

8. The composition of claim 1 further comprising at least one adhesion promoter comprising an organofunctional silane.

9. The composition of claim 1 further comprising at least one surfactant.

10. The composition of claim 1 further comprising at least one brightener.

11. A coatable, ink-receptive composition, comprising: (a) a filler; (b) a binder, comprising a homopolymer, copolymer or terpolymer of a vinyl alcohol, a vinyl acetate, a vinyl chloride or combinations of two or more thereof; (c) at least one cationic polymer derived from the reaction of an epihalohydrin with an amine or a hydroxyalkylamine and (d) at least one hydroxyalkylated polyalkyleneimine, wherein the composition, when coated on a substrate, forms an ink-receptive coating which accepts ink loading greater than about 300%.

12. The composition of claim 11 further comprising at least one surfactant.

13. The composition of claim 11 further comprising at least one brightener.

14. An aqueous coatable, ink-receptive composition, comprising: (a) a pigment; (b) a binder comprising (i) a copolymer of ethylene and at least one of vinyl alcohol, vinyl acetate and vinyl chloride and (ii) a polyvinyl alcohol, (c) a quaternary ammonium polymer, (d) a polyethyleneimine, and (e) a surfactant, wherein the composition is suitable for large format printing including a color loading greater than about 300%.

15. The composition of claim 14 further comprising at least one brightener.

16. An ink-jet recording media comprising a support having on at least one side thereof at least one ink receiving layer, derived from the composition of claim 1.

17. An ink-jet recording media comprising a support having on at least one side thereof at least one ink receiving layer, derived from the composition of claim 11.

18. An ink-jet recording media comprising a support having on at least one side thereof at least one ink receiving layer, derived from the composition of claim 14.

19. A method of making an ink-jet recording media capable of accepting high ink loading, comprising the steps of:

I) preparing the ink receptive composition of claim 1 and

II) applying the ink receptive composition to a suitable substrate to form an ink-receptive coating which accepts ink loading greater than about 300% without cracking.

20. A method of printing a large format ink-jet recording media with a high ink loading, comprising the steps of:

I) preparing the ink receptive composition of claim 1,

II) applying the ink receptive composition to a suitable large format substrate to form an ink-receptive coating; and III) printing on the ink receptive coating an ink-jet ink at a color loading greater than about 300%.

21. A laminate article comprising:

a substrate having an upper surface;

an ink receptive coating on the upper surface of the substrate, wherein the ink receptive coating comprises (a) a filler; (b) a binder, comprising a homopolymer, copolymer or terpolymer of a vinyl alcohol, a vinyl acetate, a vinyl chloride or combinations of two or more thereof; (c) a quaternary ammonium polymer, and (d) at least one hydroxylated polyalkyleneimine, wherein the coating accepts ink loading greater than about 300%;

an ink jet printed image on the ink receptive coating;

a transparent overlaminate adhered to the ink receptive coating and the printed image, wherein the overlaminate comprises a polymeric film and an adhesive layer.

22. The laminate article of claim 21 wherein the polymeric film of the overlaminate comprises a thermoplastic film.

23. The laminate article of claim 21 wherein the polymeric film of the overlaminate comprises a multilayer film.

24. The laminate article of claim 22 wherein the polymeric film comprises a vinyl film.

25. The laminate article of claim 21 wherein the adhesive layer comprises a pressure sensitive adhesive.

26. The laminate article of claim 21 wherein the adhesive layer comprises a heat activatable adhesive.

* * * * *